2,749,365
Patented June 5, 1956

2,749,365

PREVENTING COLOR FORMATION IN SULFONYL HALIDES

Joachim Dazzi, Dayton, Ohio, assignor to Monsanto Chemical Company, St. Louis, Mo., a corporation of Delaware No Drawing. Application January 19, 1953,
Serial No. 332,117

14 Claims. (Cl. 260—543)

This invention relates to the treatment of saturated aliphatic and alicyclic sulfonyl halides prepared by the Reed reaction. In one particular aspect the invention pertains to minimizing the color formation which is encountered in sulfonyl chlorides on standing.

The sulfochlorination reaction, often termed the Reed reaction, has been applied to numerous types of organic materials. By reacting organic compounds with a mixture of sulfur dioxide and chlorine, preferably at about room temperature with the aid of ultraviolet light, saturated aliphatic and alicyclic sulfonyl chlorides are formed which can be represented diagrammatically by the structural formula:

wherein R is the residue of the organic compound reacted, and is attached to the —SO$_2$Cl group at an aliphatic or alicyclic carbon atom. Sulfochlorination is perhaps most often applied to hydrocarbons, containing an aliphatic or alicyclic group, particularly paraffins. However, it is also applicable to aliphatic and alicyclic esters, acids, acid anhydrides, ketones, ethers, nitriles, chloroparaffins, polyethylene, silicones and alcohols. In view of the voluminous literature on this type of reaction, to which reference is hereby made, it is deemed unnecessary to go into great details in the present application concerning organic materials which can be sulfochlorinated and procedures for effecting this. See for example PB 67,260, issued by Office of the Publication Board of the Department of Commerce, Washington 25, D. C., on the reaction of sulfur dioxide and chlorine with hydrocarbon derivatives. The sulfochlorination reaction has also recently been extended by me to nitroalkanes, e. g., nitromethane, as described and claimed in my copending application, Serial No. 140,158, filed January 23, 1950, now U. S. Patent No. 2,718,495 issued September 20, 1955. It is well known in the art that the Reed reaction sulfochlorinates only on aliphatic or alicyclic carbon. See Fox U. S. Patent 2,346,568. See also Fox U. S. Patent 2,321,022 for sulfochlorination of the side chain only in alkyl aromatic hydrocarbons, e. g., dodecylbenzene. The present invention is broadly applicable to the treatment of all such saturated aliphatic and alicyclic sulfonyl halides.

By way of specific example of compounds that can be sulfochlorinated to give materials treatable by my invention, there can be mentioned propionic acid, caprylic acid, stearic acid, levulinic acid, glutaric acid, propionic acid anhydride, butyl stearate, hexyl adipate, methyl ethyl ketone, cyclopentanone, n-butyl chloride, chlorocyclohexane, butyl ether, lauryl alcohol, n-octanol, dodecylbenzene, propane, 2-methylheptane, icosane.

Upon completion of the sulfochlorination reaction, color begins to develop in the resulting sulfonyl chloride material. In many instances the color formation is almost immediately apparent, and some materials may become quite dark in only a matter of hours. Other more stable sulfonyl chlorides develop dark color only on standing for comparatively longer periods of time such as days or weeks, but even these materials show some color formation very quickly. Since it is often desirable to store a sulfochlorinated material either for a short time or for long periods of time, depending upon the intended use, it is apparent that color formation is a serious problem. To the best of my knowledge, this problem has not heretofore been solved.

An object of this invention is to treat sulfonyl halides prepared by the Reed reaction. Another object of the invention is to inhibit, minimize or prevent color formation in such sulfochlorinated materials. A further object is to provide treatment for such sulfochlorinated materials which is simple, inexpensive and yet greatly inhibits or completely prevents color formation on standing for long periods of time. Further objects and advantages of the invention will be apparent to one skilled in the art from the accompanying disclosure and discussion.

I have found that color formation in aliphatic sulfochlorinated and alicyclic-sulfochlorinated materials can be markedly inhibited and often prevented for long periods of time merely by giving such materials a light treatment with an alkaline material. According to preferred embodiments of my invention, sulfochlorinated organic materials are, immediately after their formation by the Reed sulfochlorination reaction, washed with an aqueous alkaline solution at a temperature sufficiently low, for a time short enough, and at a concentration of alkaline material low enough, to avoid substantial hydrolysis or other reaction of the sulfonyl chloride, and in the absence of other materials reactive with the sulfonyl chloride at the treating conditions, and then stored. During this storage the sulfochlorinated organic material undergoes little or no color formation even though the storage period extends for months or years. Although I do not wish to be bound by any theory, it is my belief that in the reaction of organic materials with a mixture of sulfur dioxide and chlorine, small amounts of a dark acidic material are formed in addition to the desired sulfonyl chloride product. It is often observed that such dark material will precipitate from the reaction mixture on standing. I have analyzed this black material for sulfur and chlorine and found it high in sulfur content but low in chlorine. It is also strongly acidic, and I believe it to be a sulfonic acid or sulfinic acid type of material. It is my thought that my alkaline treatment removes this black acidic material and that the latter or its decomposition products are the ordinary cause of color formation in sulfochlorinated materials.

The preferred type of alkaline reagent employed in the present invention for treating sulfochlorinated materials is an aqueous solution of an alkali metal hydroxide. Although all of the alkali metal hydroxides are suitable, sodium hydroxide and potassium hydroxide are preferred because of availability and cheapness. Another very desirable type of alkaline treating agent is an aqueous solution of an alkali metal carbonate or alkali metal bicarbonate. Here again, although carbonates and bicarbonates of all of the alkali metals are operable, sodium and potassium carbonates and bicarbonates are preferred. Furthermore, aqueous solutions of alkaline earth metal hydroxides, carbonates, or bicarbonates can be used in effecting the invention. The hydroxides, carbonates, and bicarbonates of all alkaline earth metals are operable, but those of calcium, strontium and barium are preferred.

Although any of the alkali metal and alkaline earth metal compounds which are alkaline reacting can be used, and preferably as aqueous solutions as described above, those which are not very soluble in water can be used as slurries or suspensions in water. All of the compounds mentioned can also be used in the form of the solid provided the solid is wet with water or sufficient water is present in the system to obtain the desired color-stabilizing effect. Thus, for example, the sulfochlorinated material to be treated can be passed through a bed of solid pellets of sodium hydroxide which contain a few per cent water, or the required amount of water can be introduced in admixture with the sulfochlorinated material and the admixture passed through a bed of sodium hydroxide pellets or a bed of any solid basic-acting material.

Anhydrous ammonia effects some color stabilization, but the effect is short-lived. An aqueous solution of ammonia can be employed to obtain the desired color stabilization. Furthermore, alkaline organic compounds, for example amines, can be used in accordance with the invention to impart color stability to sulfochlorinated materials. It must be noted however that in the use of ammonia or amines in accordance with the present invention, it is essential that the quantity of ammonia or amine be sufficiently limited, and that the treatment conditions be sufficiently mild as to quantity and concentration of ammonia or amine and time and temperature, to avoid effecting any appreciable reaction of the sulfonyl chloride to form the corresponding sulfonamide. With alkanesulfonyl chlorides, there is likelihood of forming emulsions when treating with aqueous alkaline materials, particularly aqueous sodium hydroxide or potassium hydroxide. The treatment should therefore be sufficiently mild to avoid this.

It is preferred to effect the alkaline treatment of this invention at temperatures below 50° C., and usually below room temperature, e. g., below 20° C., on down to 0° C. Ordinarily a time is used within the range of from one-half minute to one hour.

The following examples are given to illustrate some of the preferred methods of carrying out the present invention. It will be understood that the details of the materials used and proportions and treating conditions of these examples are by way of illustration.

*Example 1*

A paraffinic hydrocarbon liquid containing on the average of 16 carbon atoms per molecule was sulfochlorinated in a 1-liter, 4-necked, round-bottomed flask fitted to receive (1) an irradiation lamp, (2) a mechanically-driven stirrer, (3) a combination inlet and outlet tube, and (4) a thermometer. Chlorine and sulfur dioxide gases were metered through flowmeters, mixed in a Y tube and fed through the side neck to the bottom of the flask. This inlet tube ended in a centered glass disperser. A 4-watt General Electric U-type germicidal lamp within the reaction flask and one inch above the liquid level was used as the ultraviolet light source. The spectrum of this lamp shows the strongest irradiation at 2537 Angstrom units and weak lines between 2300 and 2400 Angstrom units.

The material subjected to sulfochlorination in this example had a specific gravity at 60° F. of 0.79, a Saybolt color of 26, which is almost water-white, a naphthene content of 10 to 13 weight per cent and a content of paraffinic hydrocarbons of 87 to 90 weight per cent. The paraffinic hydrocarbons were largely branch-chained. By A. S. T. M. distillation the initial boiling point was 476° F., 50 per cent recovered at 512° F., and the end point was 568° F.

Five moles of the $C_{16}$ hydrocarbon described was sulfochlorinated in the apparatus described, with a mixture of sulfur dioxide and chlorine gases. After the sulfochlorination was completed to the desired extent, the liquid was flushed with nitrogen to get rid of HCl and residual $SO_2$. The reaction mixture was then weighed and found to have increased in weight by 240 grams.

This sulfochlorinated material was then shaken thoroughly with 50 cc. of a 10 weight per cent potassium hydroxide solution ice-cold. The organic layer was separated from the resulting aqueous layer and dried over sodium sulfate. The dried organic material was then treated with adsorptive clay at 60° C., although this step is not essential in obtaining the color stabilization of the present invention.

The thus-treated material remained much lighter in color than an untreated sample of the same material. The untreated sample was black after less than one week. In contrast, the treated material after 14 weeks had a Gardner color of 10, and after a year's time was still comparatively light in color and transparent.

*Example 2*

Normal heptane in the amount of 15 moles was sulfochlorinated as described in Example 1. After blowing the reaction mixture with nitrogen to remove HCl and $SO_2$, the material was found to have gained 741 grams in weight. The resulting heptanesulfonyl chloride was washed with ice water and then with ice-cold 10 per cent sodium hydroxide solution. It was then washed with water until the washings came out just slightly alkaline. On storage the thus-treated material underwent no color change over a 6-week period, at the end of which time it was still perfectly clear. In contrast, heptanesulfonyl chloride prepared in exactly the same way changed color overnight. The treated sample on further standing was found to be clear and colorless 13 months after preparation.

*Example 3*

Cyclohexane in the amount of 19 moles (1596 grams) was found to increase in weight by 888 grams after sulfochlorination as described in Example 1 and nitrogen flushing. The cyclohexylsulfonyl chloride thus made was filtered to remove a slight turbidity caused by the presence of a small amount of solid cyclohexyldisulfonyl chloride. It was then water-washed, washed with ice-cold potassium hydroxide solution (about 5 weight per cent KOH in water), and then dried over sodium sulfate. An alternative method of drying is by distillation. The liquid product analyzed 10.1 weight per cent sulfur, 12.1 per cent total chlorine and 11.4 per cent hydrolyzable chlorine (chlorine directly on sulfur atom). The conversion of cyclohexane to cyclohexylmonosulfonyl chloride was 57.8 per cent. The cyclohexylsulfonyl chloride washed in the manner described with aqueous KOH remained colorless on standing over a year's time.

Although the invention is particularly adapted to the treatment of monosulfonyl chlorides, it is also applicable to the color stabilization of higher sulfonyl halides, for example disulfonyl chlorides. When these higher sulfonyl chlorides are normally solids, they can if desired be dissolved in solvents prior to treating with alkaline materials in accordance with the invention.

While the invention has been described herein with particular reference to various preferred embodiments thereof, and examples have been given of suitable proportions and conditions, it will be appreciated that variations from the details given herein can be effected without departing from the invention in its broadest aspects.

I claim:

1. A method for stabilizing saturated aliphatic and alicyclic sulfonyl halides prepared by the Reed reaction wtih sulfur dioxide and halogen which comprises treating same before color formation occurs with an alkaline material in the presence of water at non-hydrolyzing conditions to inhibit color formation in said sulfonyl halide.

2. A method for stabilizing saturated aliphatic and alicyclic sulfonyl chlorides prepared by the Reed reaction with sulfur dioxide and chlorine which comprises treating same immediately after said preparation with an alkaline material in the presence of water at non-hydrolyzing conditions to inhibit color formation in said sulfonyl chloride.

3. A method according to claim 2 wherein said treating comprises washing said sulfonyl chloride with an aqueous solution of an alkaline material.

4. A method according to claim 3 wherein said aqueous solution is an aqueous solution of an alkali metal compound.

5. A method according to claim 4 wherein said alkali metal compound is an alkali metal hydroxide.

6. A method according to claim 5 wherein said alkali metal hydroxide is potassium hydroxide.

7. A method according to claim 5 wherein said alkali metal hydroxide is sodium hydroxide.

8. A method according to claim 4 wherein said alkali metal compound is sodium carbonate.

9. A method according to claim 1 wherein said alkaline material is an alkali metal compound.

10. A method according to claim 1 wherein said alkaline material is an alkaline earth metal compound.

11. A method according to claim 2 wherein said alkaline material is employed in solid form.

12. A method according to claim 2 wherein a sulfonyl chloride of a paraffinic hydrocarbon is treated.

13. A method according to claim 2 wherein a sulfonyl chloride of naphthenic hydrocarbon is treated.

14. A method according to claim 3 wherein said washing is effected at a temperature below 50° C.

References Cited in the file of this patent

UNITED STATES PATENTS

| 1,906,761 | Luthy et al. | May 2, 1933 |
| 2,046,090 | Reed | June 30, 1936 |
| 2,346,568 | Fox | Apr. 11, 1944 |

FOREIGN PATENTS

| 625,757 | Great Britain | July 4, 1949 |